United States Patent

Puppo

[11] Patent Number: 6,137,396
[45] Date of Patent: Oct. 24, 2000

[54] MINIATURE BATTERY POWERED BEACON

[76] Inventor: Paul P. Puppo, 884 33rd Ave., San Francisco, Calif. 94121

[21] Appl. No.: 09/419,272

[22] Filed: Oct. 15, 1999

[51] Int. Cl.[7] ............................................. G08B 5/00
[52] U.S. Cl. ..................... 340/332; 340/473; 340/815.4; 340/908.1; 362/118; 362/800
[58] Field of Search ................. 340/332, 815.4, 340/426, 908.1, 473, 84; 362/118, 800

[56] References Cited

U.S. PATENT DOCUMENTS

| | | | |
|---|---|---|---|
| 4,546,416 | 10/1985 | Pemberton | 362/84 |
| 5,585,783 | 12/1996 | Hall | 340/473 |
| 5,594,433 | 1/1997 | Terlep | 340/908.1 |
| 5,861,801 | 1/1999 | Cullen | 340/426 |
| 5,905,441 | 5/1999 | Klee et al. | 340/815.4 |

*Primary Examiner*—Jeffery A. Hofsass
*Assistant Examiner*—Phung Nguyen

[57] ABSTRACT

An Improved method of marking locations and obstacles in low light situations comprised of an LED, with an integral resistor to allow it to be powered from a 9 vdc source, that is connected, via the anode and the cathode, to a pair of battery terminals. These terminals allow it to be attached to a conventional 9 volt battery. The terminals are affixed to a base that the LED sits upon. The base is covered with a cap that prevents any movement of the LED.

1 Claim, 3 Drawing Sheets

MINIATURE BATTERY POWERED BEACON

BACKGROUND—FIELD OF INVENTION

This invention relates to theatre, dance, and performing arts, specifically the visual marking of precise locations and obstacles in low light level areas.

BACKGROUND—DESCRIPTION OF PRIOR ART

During a dance performance or theatrical production the edge of the stage can be very difficult to see, furthermore dancers need to know where the centerline of the stage is, as well as the points half way from the center to the left and right off stage edges. Also, obstacles in the off stage areas, such as lighting positions, can be difficult to see in the semi-darkness (compared to the light on stage).

In the past the edge of the stage, centerline, and other marks were made with "Glow Tape", a phosphorescent adhesive tape that glows after exposure to light. This does not adequately solve the problem. Due to the very narrow viewing angle, the observer needs to be almost directly above the "Glow Tape" to view it. Very often the "Glow Tape" does not absorb the proper amount of light, or light for a long enough period of time, to sufficiently discharge and be seen. "Glow Tape" is limited to one yellow-green color. Given its adhesive tape qualities it is a one-time use product and can be prohibitively expensive.

Miniature lights and neon bulbs have been used before but these require long lengths of electrical wire and the presence of line level voltage in the performance area.

LEDs attached to batteries have been attempted before but this is usually a clumsy device soldered to miniature watch batteries or encased in a fragile box, which is an obstacle for the performers.

SUMMARY INCLUDING OBJECTS AND ADVANTAGES

SUMMARY

In accordance with the present invention a beacon comprises a body surrounding an LED. This LED is attached to battery terminals to allow it to be connected to a conventional 9-volt battery for power.

OBJECTS AND ADVANTAGES

Accordingly, several objects and advantages of my invention are a reusable and long lifetime light source. The invention also can be built with-different colored LEDs so as to mark different locations or obstacles. The device can also be built with blinking LEDs for another option of marking. It is powered by a 9-vdc battery, which are very common in the theatre, being used in wireless microphones. But in the microphone, the 9-vdc battery is not reliable after a voltage loss of +/−0.5 vdc. The minimum voltage threshold for the device is very low, so it can utilize the "used" batteries from the wireless) microphones. The size of the invention is smaller than the end of the 9-vdc battery so when attached to the battery, and in place on the stage floor, the device is sheltered from footsteps by the case of the battery. When placed on the stage and pointed away from the audience, the battery shields the light from the audience. The viewing angle of the beacon is from 0° through 90°, providing a very large area from which it can be seen. Given its very small size and the fact that one can connect to the next, for storage, they travel very well. Being battery powered and not wired together their placement can be very flexible.

Figure 1:
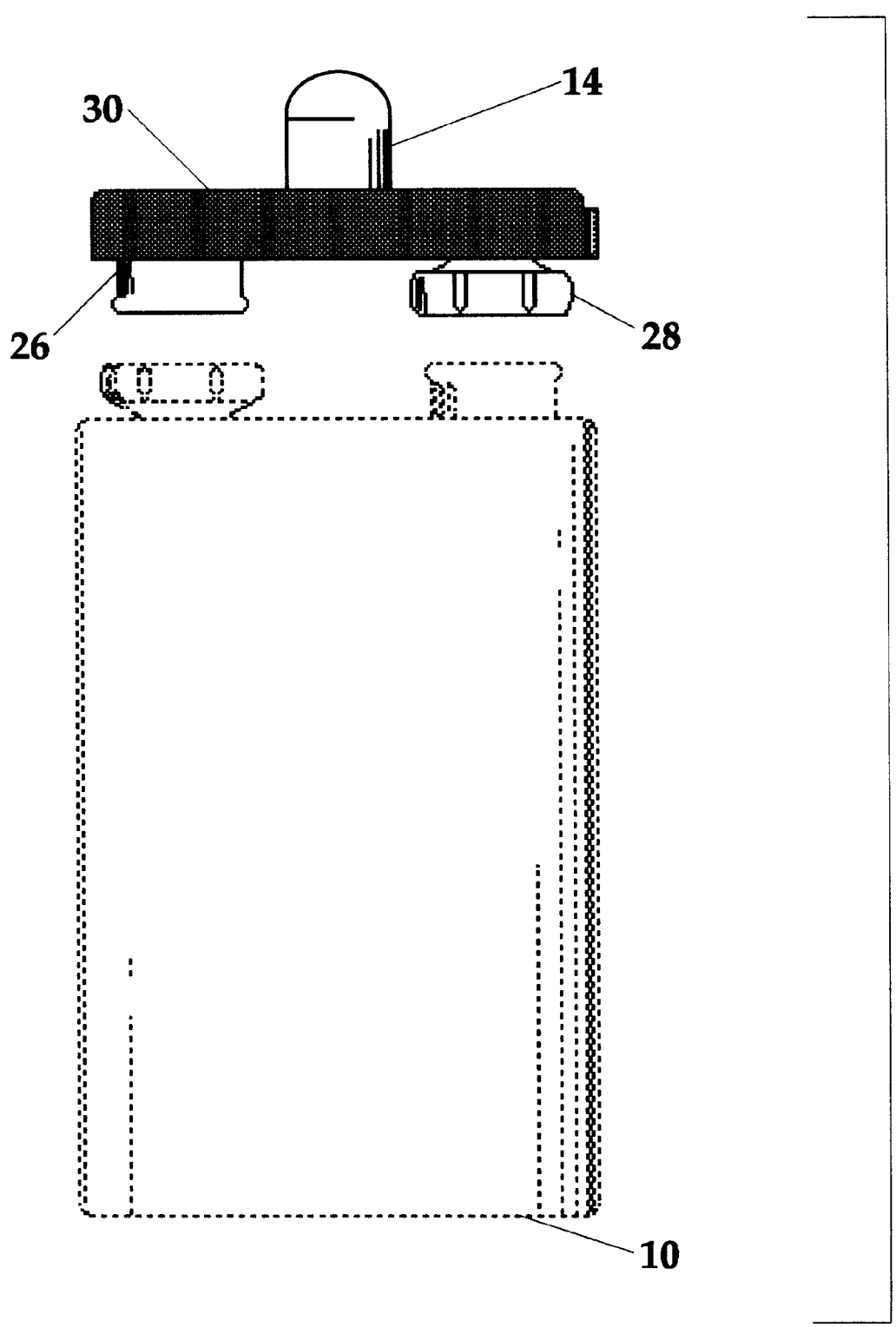
FIG. 1 shows the invention and how it relates to a conventional 9 volt battery.

REFERENCE NUMERALS 10 conventional 9 volt battery
12 base
14 LED
16 anode
18 cathode
20 left hand hole
22 center hole
24 right hand hole
26 male battery terminal
28 female battery terminal
30 cap

PREFERRED EMBODIMENT—DESCRIPTION

Description—FIGS. 1–4

Figure 4:
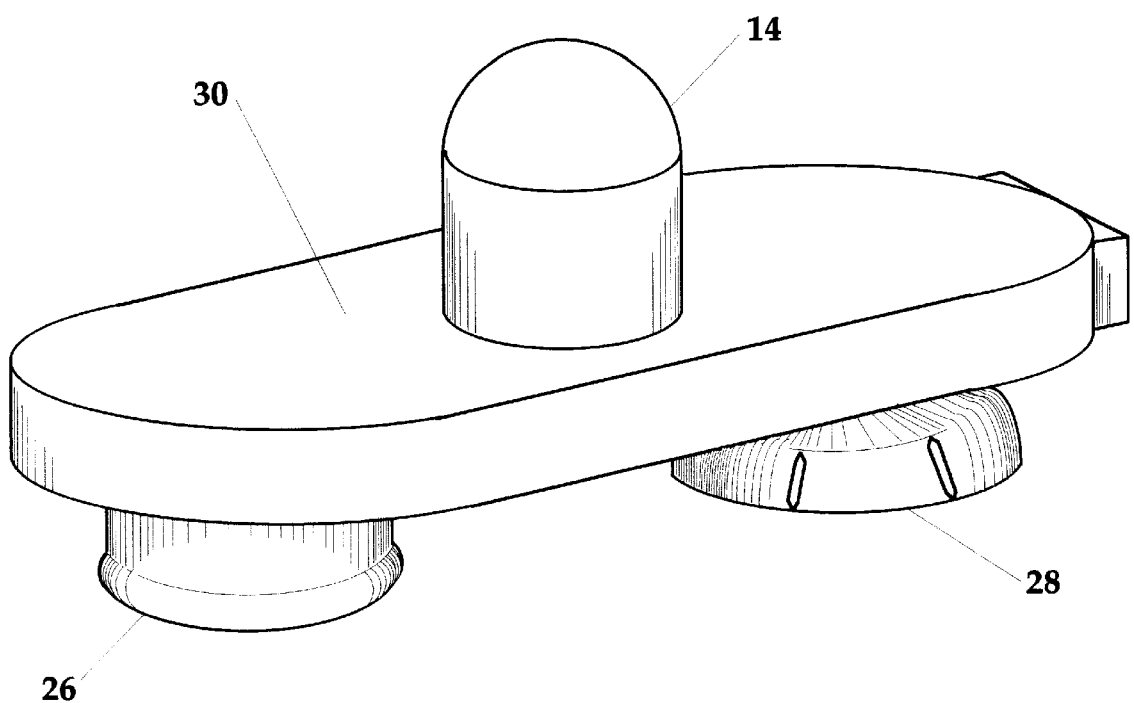
FIG. 4 is a perspective view of the device.

A typical embodiment of the beacon of the present invention is shown in FIG. 1, along with its relationship to a conventional 9-volt battery 10. FIG. 4 shows a perspective view of the invention, illustrating how a cap 30 surrounds an internally-resistored LED 14. (The LED 14 can also be an internally-resistored blinking LED)

Figure 3:
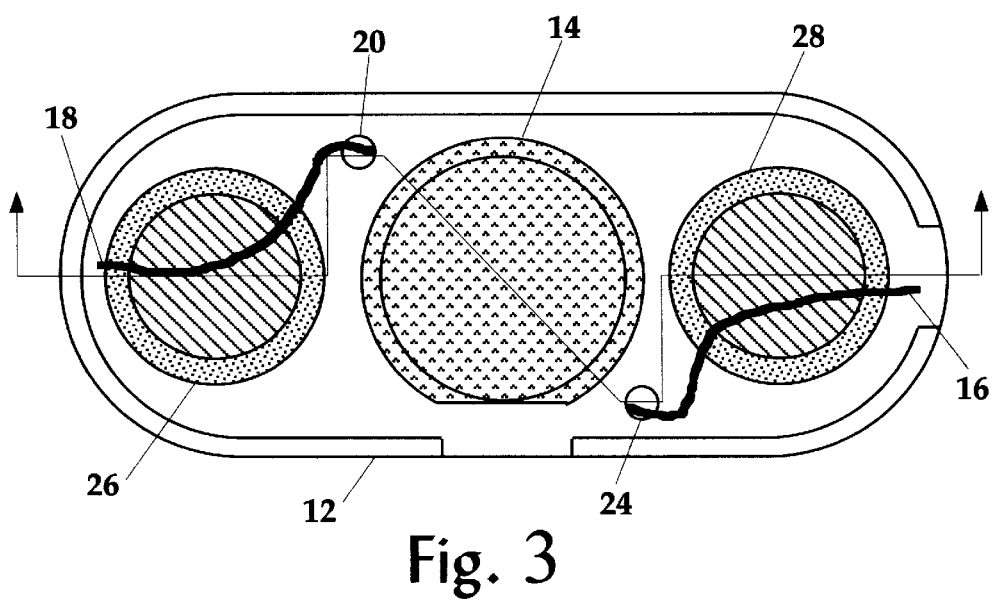
FIG. 3 is a section view of the invention showing the anode and cathode passing through the base.

The section view of FIG. 3 shows the LED 14 sitting flat on a base 12 to prevent any rocking side to side. The LED 14 has an anode 16, and a cathode 18. The anode 16 and the cathode 18 pass down through a center hole 22. The anode 16 then passes up through a right hand hole 24 and is then soldered to the top of a female battery terminal 28. The cathode 18 passes up through a left hand hole 20 and is soldered to the top of a male battery terminal 26. This allows the LED 14 to be powered by the conventional 9-volt battery 10. The cap 30 snaps on to the base 12 and surrounds the LED 14 and prevents any movement.

Figure 2:
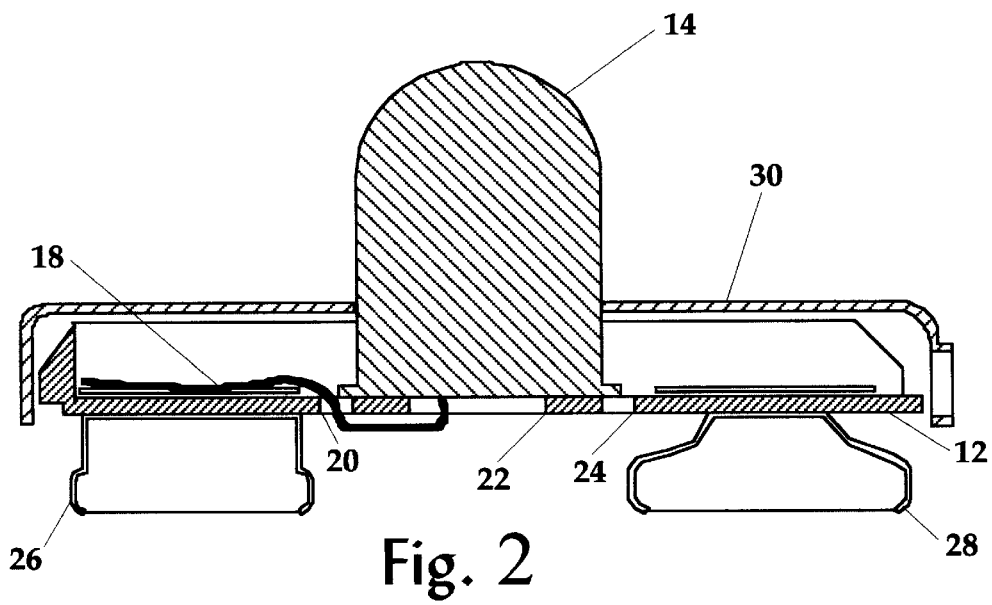
FIG. 2 is a plan view showing the interior of device without the cap attached.

FIG. 2 is a plan view of my invention with the cap 30 removed so as to see the interior. FIG. 2 shows the line (long-short-short-long) of the plane of the section view in FIG. 3.

PREFERRED EMBODIMENT—OPERATION

Operation—FIG. 1

When my invention is connected to a conventional 9-volt battery 10 the LED 14 illuminates. The device, while attached to the battery 10, can then be placed on the edge of the stage at centerline with the LED 14 facing towards the performers. Additional devices, in different colors, or with blinking LEDs 14, can then be placed to mark other locations or obstacles.

OTHER EMBODIMENTS

Alternate LEDs—Description

My invention can be made with a resistored LED 14 in red, yellow, or green (or any color available resistored LEDs). The device can also be made with any color blinking resistored LEDs.

Alternate LEDs—Operation

With my invention made with different colored LEDs it can then mark different locations or obstacles with different colors. If the device is made with blinking resistored LEDs it can be used to alert the viewer to still a different obstacle.

CONCLUSION, RAMIFICATIONS, AND SCOPE

Accordingly, it can be seen that the beacon of the invention provides a compact, highly reliable, durable, yet economical device that can be used to mark locations and obstacles in many situations.

Although the description above contains many specificities, these should not be construed as limiting the scope of the invention but as merely providing illustrations of some of the presently preferred embodiments of this invention. Various other embodiments and ramifications are possible within it's scope. For example, my invention can be built with different colored LEDs and can then be used to color code locations or obstacles. Resistored LEDs with integral blinking circuits provide yet another option, and can be used where more attention needs to be drawn to a situation.

Thus the scope of the invention should be determined by the appended claims and their legal equivalents, rather than by the examples given.

What is claimed is:

1. A miniature battery operated beacon comprising:
   a. a single source of light that provides a substantially narrow field of view to indicate a finite point in space and,
   b. a holder smaller than the end of a 9 volt battery comprising: (1) a base to support said source of light said base having an underside and, (2) a cap that surrounds and supports said source of light and,
   c. a pair of terminals that are affixed to said underside of said base and electrically attached to said source of light allowing said source of light to be mounted on to a conventional 9 volt storage battery so as to be illuminated by said conventional 9 volt storage battery
   whereby said conventional 9 volt storage battery provides sole support for the entire device.

* * * * *